(12) United States Patent
Lakamraju et al.

(10) Patent No.: US 8,562,721 B2
(45) Date of Patent: Oct. 22, 2013

(54) BATTERY FIRE PREVENTION DEVICE

(75) Inventors: Vijaya Ramaraju Lakamraju, Longmeadow, MA (US); Ulf J. Paholsky, South Windsor, CT (US); Richard J. Paholsky, Rocky Hill, CT (US); John M. Milton-Benoit, West Suffield, CT (US); John J. Calabrese, Plantsville, CT (US)

(73) Assignee: UTC Fire & Security Corporation, Farmington, CT (US)

( * ) Notice: Subject to any disclaimer, the term of this patent is extended or adjusted under 35 U.S.C. 154(b) by 47 days.

(21) Appl. No.: 13/264,229

(22) PCT Filed: Apr. 16, 2009

(86) PCT No.: PCT/US2009/002366
§ 371 (c)(1),
(2), (4) Date: Oct. 13, 2011

(87) PCT Pub. No.: WO2010/120263
PCT Pub. Date: Oct. 21, 2010

(65) Prior Publication Data
US 2012/0024155 A1    Feb. 2, 2012

(51) Int. Cl.
*H01M 2/12* (2006.01)
(52) U.S. Cl.
USPC .................... 95/273; 55/385.4; 429/82
(58) Field of Classification Search
USPC .......... 55/385.1, 385.4; 429/82, 175, 176, 56, 429/232, 245, 210; 361/605; 252/520.4, 252/520.2
See application file for complete search history.

(56) References Cited

U.S. PATENT DOCUMENTS

| 5,083,122 | A | 1/1992 | Clark |
| 6,588,532 | B1 | 7/2003 | Adams et al. |
| 2003/0036001 | A1 | 2/2003 | James et al. |
| 2004/0012370 | A1 | 1/2004 | Miller |
| 2005/0170238 | A1 | 8/2005 | Abu-Isa et al. |
| 2006/0028068 | A1 | 2/2006 | Koutsandreas et al. |
| 2006/0292436 | A1 | 12/2006 | Cook et al. |

FOREIGN PATENT DOCUMENTS

EP    0737367 B1    7/1997

OTHER PUBLICATIONS

Author Unknown, "Extended European Search Report," dated Sep. 19, 2012, in corresponding European Patent Application No. 09843426.9, pp. 1-4, published by the European Patent Office.
The Jan. 18, 2010 International Search Report for International Application No. PCT/US2009/002366.

*Primary Examiner* — Duane Smith
*Assistant Examiner* — Minh-Chau Pham
(74) *Attorney, Agent, or Firm* — MH2 Technology Law Group LLP

(57) ABSTRACT

A battery fire prevention device includes a lithium battery, a container, and a porous material. The container houses the lithium battery and has an outwardly interfacing wall with an aperture which extends therethrough to vent outgassed battery constituents generally away therefrom. The porous material is disposed within the container between the aperture and the battery. The porous material is capable of trapping lithium particulates outgassed from the lithium battery within the container.

13 Claims, 3 Drawing Sheets

BATTERY FIRE PREVENTION DEVICE

BACKGROUND

The present invention relates to battery containment devices, and more particularly to a lithium battery containment device adapted for fire prevention.

Lithium batteries provide a power source for a variety of products including portable consumer electronic devices such as thermostats and smoke/carbon monoxide alarms. Attempts have also been made to incorporate lithium battery technology into electronic door locks.

Electronic door locks, as opposed to pure mechanical locks, need a power source to operate the locking and control mechanism. In battery operated electronic door locks, power is obtained from a set of batteries installed in the lock. The most commonly used batteries in electronic door locks are alkaline batteries. The service life (the time after which the batteries need to be replaced) depends on the usage of the lock, but is typically two to three years for normal usage doors. More recently, attempts have been made to increase battery service life by incorporating additional types of battery technology including lithium battery technology. However, practical application of lithium battery technology in electronic door locks has failed due in part to the adverse affect lithium technology has on the integrity and specifications of fire rated doors. Lithium batteries adversely affect the integrity and specifications of fire rated doors because the batteries can violently deflagrate and experience severe outgassing when exposed to temperatures representative of that found during a building fire. The violent deflagration of the lithium batteries has the undesirable effect that it can cause the fire on one side of the fire rated door to propagate to the other side and hence compromise the intended function of a fire door.

SUMMARY

In one aspect, a battery fire prevention device includes a lithium battery, a container, and a porous material. The container houses the lithium battery and has an outwardly interfacing wall with an aperture which extends therethrough to vent outgassed battery constituents generally away therefrom. The porous material is disposed within the container between the aperture and the battery. The porous material is capable of trapping lithium particulates outgassed from the lithium battery within the container.

In another aspect, a method of preventing outgassed constituents of a lithium battery from contacting a hot surface of an electronic door lock, the method includes trapping lithium particulates within a containment device of the electronic door lock. The containment device vents outgassed battery constituents away from the hot surface of the electronic door lock.

DETAILED DESCRIPTION

Figure 1:
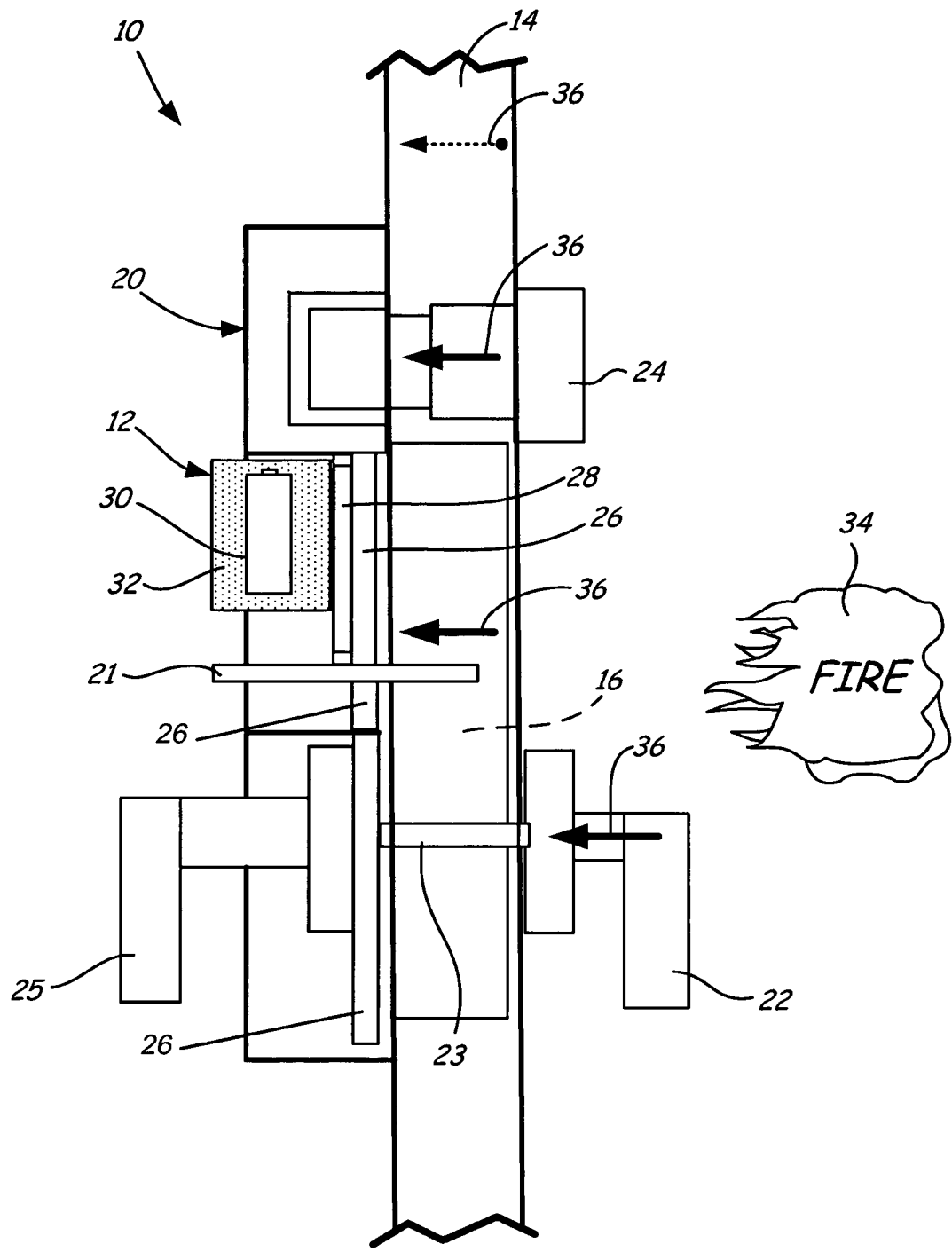
FIG. 1 is a schematic view of an electronic door lock including a containment device.

FIG. 1 is a schematic view of one of many designs for an electronic door lock 10 including a containment device 12. The door lock 10 is disposed in a door 14. The door lock 10 includes a mortise 16, an inner escutcheon or lock cover 20, a shaft block 21 for the dead bolt, an outer handle or knob 22, a shaft 23, a reader 24, an inner handle or knob 25, a plate 26, and a printed circuit board 28. The containment device 12 houses a lithium battery 30 and a porous material 32. FIG. 1 represents one particular embodiment of an electronic door lock, various other electronic door lock designs and portable consumer electronic devices would benefit from the fire containment and prevention device disclosed herein. The electronic door lock 10 extends through the door 14 between an interior side and an exterior side thereof. In the embodiment shown, the hollow containment device 12 is disposed on the interior side of the door 14. The door 14 can be part of a vehicle or part of a residential/commercial/hospitality structure. Although the electronic door lock 10 extends from the door 14, portions of the lock 10, for example the shaft block 21, can be partially housed within the mortise 16 in the door 14. The electronic door lock 10 has portions which extend from the door 14 including the inner lock cover 20.

The shaft block 21 movably extends from the mortise 16 through the inner lock cover 20. The outer handle 22 connects to the shaft 23 which rotatably extends through the door to connect to the inner handle 25. The reader 24 projects from the outer side of the door 14 and is adapted to receive a coded medium such as a magnetic card, proximity card, or memory key. The inner lock cover 20 houses portions of the inner handle or knob 25, the plate 26, the printed circuit board 28, and the containment device 12.

The plate 26 and printed circuit board 28 extend along the exterior of the door 14 beneath the inner lock cover 20. In the embodiment shown, the containment device 12 is a hollow rectangular structure which houses the lithium battery 30 and porous material 32. The porous material 32 is disposed between the lithium battery 30 and an outward interfacing wall of the containment device 12 and can be wrapped substantially around the entire lithium battery 30. The lithium battery 30 supplies power to the reader 24, the printed circuit board 28, and components or the mortise 16 allowing the door lock 10 to assume an open or locked state.

In the instance of an external fire 34, (a fire in a fire zone exterior to the door 14—for example, the hallway in most hospitality situations) heat from the fire will most effectively pass through the door 14 via conduction 36, convection and other forms of heat transfer. For example, a fire zone temperature of about 650° C. on the exterior side of the door 14 in some cases can result in temperatures on the interior side of the door 14 exceeding about 370° C. due to conduction of heat through the door 14. A temperature of about 370° C. can be high enough to ignite components of the electronic door lock 10. More specifically, at temperatures of about 370° C. certain electrical components of the printed circuit board 12 or other components of the electronic door lock 10 can ignite and begin to combust. As will be discussed subsequently, "hot surfaces" (i.e., components that can ignite and begin to combust at lower temperatures) such as parts of the electronic door lock 10 or door 14 can act as ignition sources for flammable battery constituents outgassed from the lithium battery 30. The printed circuit board 12 is one such problematic potential ignition source. In the presence of an ignition source such as the printed circuit board 12, the outgassed battery constituents (especially flammable gases and fumes) can violently ignite thereby propagating a flame from the door 14, into the space exterior to the door 14 (a guest room in the example of the hospitality situation given above) from the external fire 34.

With regard to the lithium battery 30 at elevated temperatures, when the temperature experienced by the lithium battery 30 is in the range of about 160° C. to 180° C., the lithium battery 30 experiences an initial outgassing and some constituents of the lithium battery 30 are outgassed away from the lithium battery 30. These constituents include a mixture of flammable gases and less flammable gasses and fumes. When the lithium battery 30 experiences temperatures of about 400° C. the lithium battery 30 deflagrates and experiences a second large outgassing of battery constituents including flammable gases and less flammable gases and fumes. This second outgassing is generally much larger then the first, and thus, has a greater chance of violently igniting in the presence of an ignition source to propagate a flame into the door 14, electronic door lock 10, and space interior to the door 14 from the external fire 34 in the original fire zone. Hot lithium particulates that have temperatures of about 200° C. are also associated with lithium battery 30 deflagration. When exposed to air these lithium particulates ignite and become ignition sources which can violently ignite the other outgassed battery constituents (especially the flammable gases and fumes outgassed from the battery 30) and propagate a flame as discussed above.

Thus, the containment device 12 is configured to vent outgassed battery constituents out of the containment device 12 and away from hot surfaces of the door lock 10 while trapping lithium particulates (potential ignition sources) within the containment device 12. Outgassed battery constituents are vented from the containment device 12 in part to reduce the potential for pressure induced explosion of the containment device 12. Venting minimizes interaction between the outgassed battery constituents and one potential ignition source (lithium particulates), thereby reducing the likelihood of a flame. More particularly, interaction between the flammable outgassed battery constituents and ignition sources is minimized by the containment device 12 which directs the venting of the outgassed battery constituents away from ignition sources such as the electronic door lock 10 or door 14. The containment device 12 houses the porous material 32 which is sized to trap the lithium particulates while letting the other outgassed battery constituents therethrough. The porous material 32 keeps the lithium particulates from reaching the air and becoming ignition sources. Thus, the porous material 32 minimizes interactaction between the outgassed battery constituents and one potential ignition source (lithium particulates) for the constituents.

By utilizing the components and fire prevention techniques disclosed herein, lithium technology can be successfully incorporated into electronic door locks while maintaining the integrity and specifications of the fire rated doors into which the electronic door locks are installed. With the incorporation of lithium technology in electronic door locks, the service life of the battery can be extended to over ten plus years, rather than the two to three year battery service life achieved with alkaline batteries. This increase in battery service life allows for a reduction in operational costs associated with replacement of door lock batteries.

The example given of an electronic door lock and the configuration of the electronic lock shown in FIG. 1 are exemplary, and therefore, neither the arrangement of the components of the lock nor the exemplary choice of an electronic door lock are intended to be in any way limiting. For example, the containment device could be used in a smoke or carbon monoxide alarm. The disposition of the containment device within a door lock could be altered to place the containment device in a mortise in the door or in an escutcheon on the exterior side of the door. From either position the containment device could be configured to vent outgassed battery constituents out to the exterior side of the door (for example the hallway in a hospitality situation such as a hotel). Either position could be advantageous in a situation where the fire arises on the interior side of the door. FIG. 1 simply illustrates one embodiment of an electronic lock that would benefit from the battery containment device 12 therein.

Figure 2:
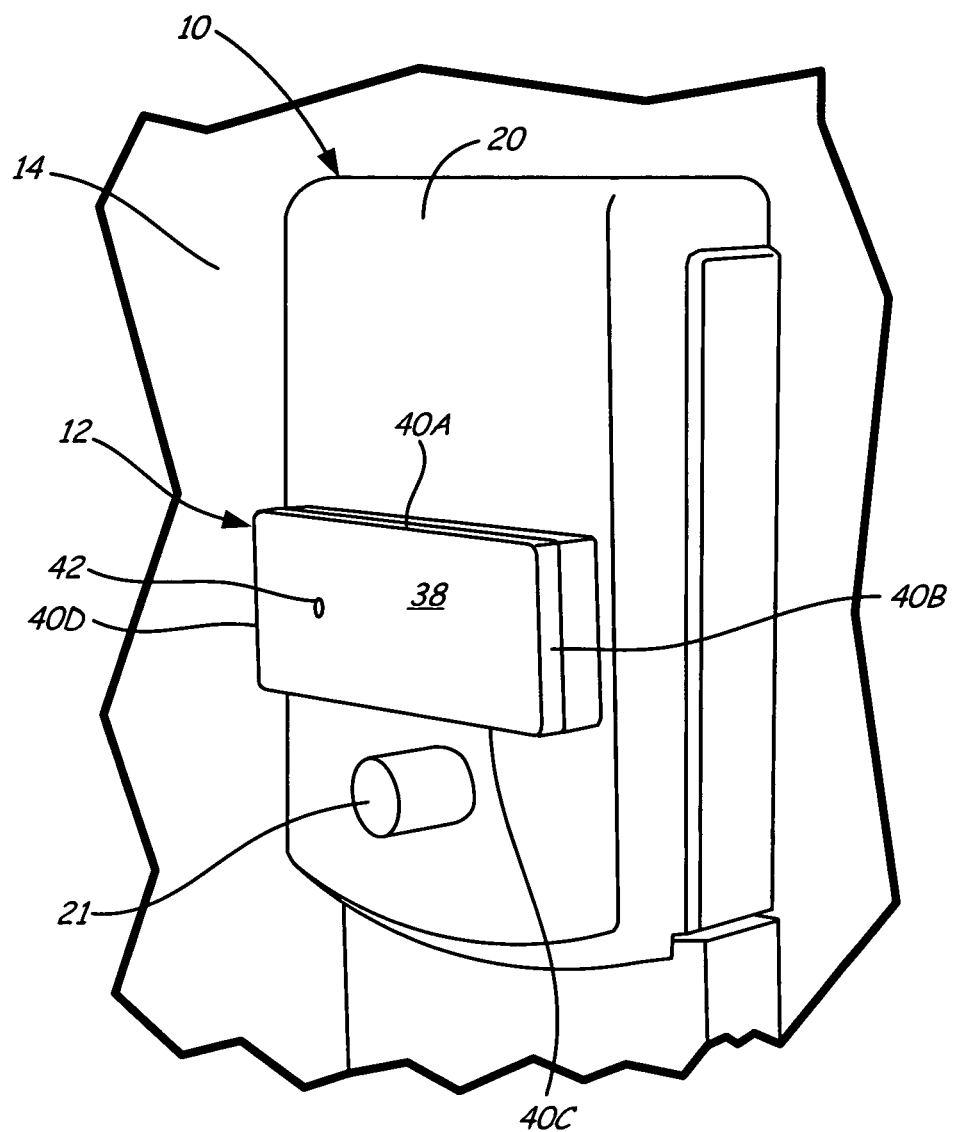
FIG. 2 is one embodiment of the outward interfacing wall portion of the containment device.

FIG. 2 shows one embodiment of the containment device 12 installed on the electronic door lock 10. The containment device 12 includes an outer wall 38, sidewalls 40A-40D, and an aperture 42.

The inner lock cover 20 portion of the electronic door lock 10 extends from an interior side surface of the door 14. The containment device 12 is disposed partially in and extends through the inner lock cover 20 above the shaft block 21. As discussed previously, the containment device 12 is a hollow structure with a plurality of walls surrounding the lithium battery 30 and porous material 32 (FIG. 1). In the embodiment shown, one of the walls of the containment device 12 is the outer wall 38 which extends generally parallel with the inner lock cover 20 and interfaces with the interior space partitioned by the door 14. The sidewalls 40A-40D interconnect with the outward interfacing wall 38 at a generally perpendicular angle and extend inward into the inner lock cover 20 at an angle that is generally perpendicular to the interior side surface of the door 14. The aperture 42 extends through the outer wall 38 from the interior of the containment device 12.

Both the outer wall 38 and sidewalls 40A-40D can be constructed from a metallic material such as aluminum or steel, and if constructed from aluminum preferably should have a wall thickness that exceeds about 3 mm. This thickness keeps the lithium particulates outgassed from the lithium battery 30 from breaching the walls of the containment device 12. In one embodiment, the aperture 42 (or a plurality of apertures) has a diameter of between about 4 mm and about 6 mm, and extends through any externally interfacing wall 38 and/or 40A-40D (i.e., a non-electronic door lock 10 interfacing wall) of the containment device 12. Extending the aperture 42 through any of the externally interfacing walls 38 and/or 40A-40D of the containment device 12 allows outgassed constituents of the lithium battery 30 to be directionally vented away from hot surfaces (potential ignition sources) such as the electronic door lock 10 or door 14 thereby minimizing interaction between the outgassed battery constituents and the ignition sources. More than one aperture 42 can extend through any of the outward interfacing walls (in the embodiment shown more than one aperture 42 can extend through either wall 38 and/or sidewalls 40A-40D) and apertures 42 can extend through both the outer wall 38 and sidewalls 40A-40D. However, having apertures 42 extend through both the top sidewall 40A and the bottom sidewall 40C (relative to the door 14) is not advisable due to the direction of convection airflow that arise during a fire 34. Apertures 42 that extend through both the top sidewall 40A and bottom sidewall 40C are not advisable because the apertures 42 may allow air to reach the outgassed lithium particulates trapped within the containment device 12. This would allow the lithium particulates to become ignition sources for the remaining outgassed constituents of the lithium battery 30 (FIG. 1). The aperture 42 can be of any shape but should have an area small enough (between about 4 mm and about 6 mm in diameter) to prevent large amounts of air from circulating into the interior of the containment device 12 and igniting the lithium particulates trapped therein.

Figure 3:
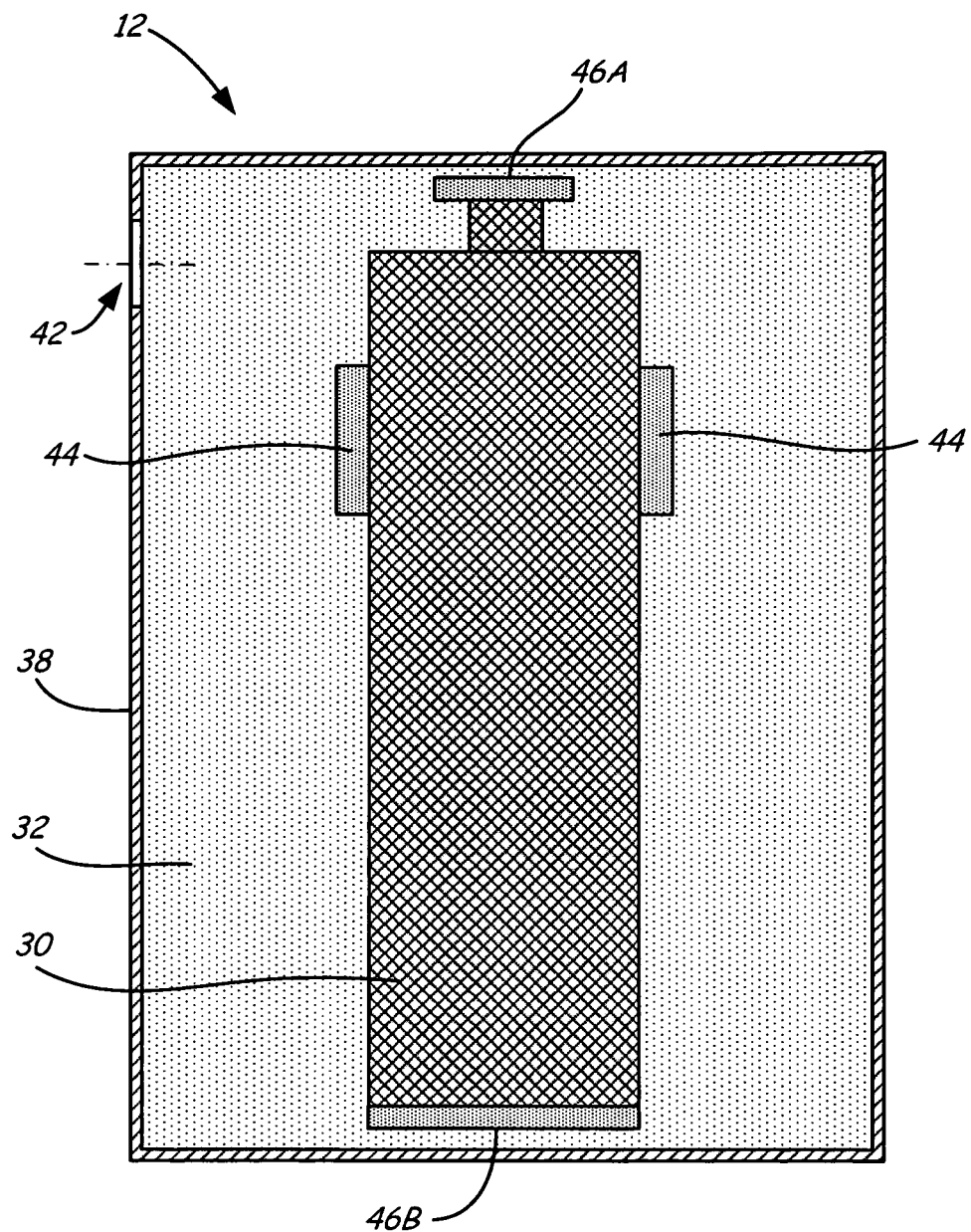
FIG. 3 is a sectional view of the embodiment of the containment device.

FIG. 3 is a sectional view of the containment device 12. In addition to the lithium battery 30, the porous material 32 and the aperture 42, the containment device 12 includes tabs 44 and contacts 46A and 46B.

The containment device 12 surrounds the lithium battery 30 and the porous material 32. In the embodiment shown, the aperture 42 extends through the outer wall 38 of the containment device 12 to communicate with the interior of the containment device 12. The lithium battery 30 is retained within the interior of the containment device 12 by tabs 44 of a battery holder. The terminals of the lithium battery 30 about electrical contacts 46A and 46B of the battery holder to provide electrical current from the lithium battery 30 to the other electronic components of the electronic door lock 10 (FIG. 1). The connections to the lithium battery 30 are extended out of the box through a —small hole in the top wall of the containment device 13. The hole is sized and tolerance such that at moderate temperatures such as 150° C., the wiring would melt and plug the hole used for getting the battery connections out of the containment device 12. This would ensure that gases only escape through vent aperture(s) 42 and not through the hole required for connections 46A and 46B.

In the embodiment shown, the lithium battery 30 is surrounded by the porous material 32. The porous material 32 can be a high temperature fiber ceramic with a fiber density of about 2.73 gm/cc. In one embodiment, the porous material 32 is comprised of calcium aluminum silicate and has aluminum oxide fibers such that the porous material 32 can withstand temperatures which exceed 815° C. An example of one such ceramic fiber material is product number ASBF-1 manufactured by ZIRCAR Ceramics, Inc. of Florida, N.Y. Specifically, the ASBF-1 ceramic fiber is composed of between 47-52 $Al_2O_3$, 48-53 $SiO_2$, <0.5 $Na_2O$, <0.1 Iron Oxides, and <0.1 $TiO_2$ by weight percent. The ASBF-1 fiber has an average diameter of 1.5 to 2.5 microns and a fiber index percent of ≥65 as measured by the conical elutriator method.

The porous material 32 has a mesh or gap size small enough to trap and retain the hot lithium particulates (which can have a diameter of about 1 mm) within the containment device 12 while allowing the remainder of the outgassed constituents from the lithium battery 30 to pass therethrough to the aperture 42. The outgassed constituents pass through the aperture 42 and are directionally vented away from the containment device 12 and electronic door lock 10 (FIG. 1) and other potential ignition sources. The porous material 32 keeps the lithium particulates from reaching the air outside the containment device 12 and becoming ignition sources. Thus, the porous material 32 minimizes interaction between the outgassed battery constituents and one potential ignition source (lithium particulates).

Although the present invention has been described with reference to preferred embodiments, workers skilled in the art will recognize that changes may be made in form and detail without departing from the spirit and scope of the invention.

The invention claimed is:

1. A battery fire prevention device, comprising:
   a lithium battery;
   a container housing the lithium battery and having an aperture which extends through a wall portion thereof to vent outgassed battery constituents away therefrom; and
   a porous material disposed within the container between the aperture and the battery, the porous material being capable of trapping lithium particulates outgassed from the lithium battery within the container.

2. The battery fire prevention device of claim 1, further comprising an electronic door lock, the aperture directs the outgassed battery constituents through the wall portion generally away from hot surfaces of the electronic door lock.

3. The battery fire prevention device of claim 1, wherein the aperture extends through a generally vertical outwardly interfacing wall of the container to direct the outgassed battery constituents generally outward away from the container and electronic door lock.

4. The battery fire prevention device of claim 1, wherein the porous material is a fibrous ceramic substance.

5. A method of preventing fire from the outgassing of a lithium battery, comprising:
   trapping lithium particulates within a containment device; and
   venting outgassed battery constituents away from the containment device through an aperture therein, wherein the lithium particulates are trapped by a porous material disposed within the containment device.

6. The method of claim 5, wherein the porous material is a fiberous ceramic material.

7. The method of claim 5, further comprising providing a door with an electronic door lock installed therein, wherein the aperture directs the outgassed battery constituents generally away from hot surfaces of the door or the electronic door lock.

8. The method of claim 7, wherein the venting the out gassed battery constituents passes the constituents through the aperture in an outwardly interfacing wall of the containment device.

9. The method of claim 5, wherein the aperture is between about 4 mm and about 6 mm in diameter.

10. An electronic door lock incorporating a battery fire prevention device, comprising:
    a lock cover housing electronic components of the electronic door lock therein; and
    a containment device connected to the lock cover, the containment device housing a lithium battery therein and having an aperture which extends through an outwardly interfacing wall portion thereof to vent outgassed battery constituents generally away from the electronic door lock; and
    a porous material housed within the containment device, the porous material for trapping lithium particulates outgassed from the lithium battery within the containment device.

11. The electronic door lock of claim 10, wherein the porous material a fiberous ceramic material.

12. The battery fire prevention device of claim 10, wherein the containment device vents the outgassed battery constituents generally away from hot surfaces of the electronic door lock or a door.

13. The battery fire prevention device of claim 10, wherein the aperture is between about 4 mm and about 6 mm in diameter.

* * * * *

UNITED STATES PATENT AND TRADEMARK OFFICE
CERTIFICATE OF CORRECTION

PATENT NO. : 8,562,721 B2  Page 1 of 1
APPLICATION NO. : 13/264229
DATED : October 22, 2013
INVENTOR(S) : Vijaya Ramaraju Lakamraju et al.

It is certified that error appears in the above-identified patent and that said Letters Patent is hereby corrected as shown below:

On the title page, Item (75) Inventors: "Vijaya Ramaraju Lakamraju, Longmeadow, MA (US); Ulf J. Paholsky, South Windsor, CT (US); Richard J. Paholsky, Rocky Hill, CT (US); John M. Milton-Benoit, West Suffield, CT (US); John J. Calabrese, Plantsville, CT (US)" should read -- Vijaya Ramaraju Lakamraju, Longmeadow, MA (US); Ulf J. Jonsson, South Windsor, CT (US); Richard J. Paholsky, Rocky Hill, CT (US); John M. Milton-Benoit, West Suffield, CT (US); John J. Calabrese, Plantsville, CT (US) --

Signed and Sealed this
Tenth Day of December, 2013

Margaret A. Focarino
*Commissioner for Patents of the United States Patent and Trademark Office*